United States Patent [19]
Fontana et al.

[11] Patent Number: 5,910,852
[45] Date of Patent: Jun. 8, 1999

[54] MODULATED AND DEPOLARIZED OPTICAL SIGNAL TRANSMISSION SYSTEM

[75] Inventors: Flavio Fontana, Cormano; Federico Franzoso, Loreo; Giuseppe Ravasio, Capriate; Claudio Zammarchi, Milan, all of Italy

[73] Assignee: Pirelli Cavi S.p.A., Italy

[21] Appl. No.: 08/759,792

[22] Filed: Dec. 3, 1996

[30] Foreign Application Priority Data

Dec. 21, 1995 [IT] Italy .................................. MI95A2722

[51] Int. Cl.$^6$ ...................................................... H04B 10/00
[52] U.S. Cl. ........................... 359/156; 359/173; 359/161
[58] Field of Search ..................................... 359/156, 161, 359/173, 181, 183, 188

[56] References Cited

U.S. PATENT DOCUMENTS

| | | | |
|---|---|---|---|
| 4,572,608 | 2/1986 | Mochizuki et al. | 350/96.15 |
| 5,477,375 | 12/1995 | Korotky et al. | 359/183 |
| 5,729,372 | 3/1998 | Terahara et al. | 359/181 |

FOREIGN PATENT DOCUMENTS

| | | | |
|---|---|---|---|
| 0328156 | 8/1989 | European Pat. Off. | H04B 14/00 |
| 0503579 | 9/1992 | European Pat. Off. | H04B 10/18 |
| 0570151 | 11/1993 | European Pat. Off. | H04B 10/12 |

*Primary Examiner*—Kinfe-Michael Negash
*Attorney, Agent, or Firm*—Norris MC Laughlin & Marcus; L. P. Brooks

[57] ABSTRACT

An optical communication system is described which includes an optical source; an optical modulator, receiving a transmission signal having frequencies included within a signal band and adapted to emit a modulated optical signal of a predetermined optical bandwidth; an optical transmission line comprising an optical fiber portion; and an optical receiver adapted to receive the optical signal in the presence of a predetermined SNR in the signal band, measured in a 5 MHz band. The telecommunication system further comprises, optically connected between the optical modulator and the optical transmission line, a depolarizer comprising two polarization-maintaining optical fiber portions, optically connected with each other in such a manner that the respective polarization axes form an angle of 45°, in which the optical bandwidth, lengths and birefringence of the polarization-maintaining optical fibers are operatively selected so that the SNR at the receiver in the signal band does not differ more than 1 dB from the SNR at the receiver measured in a band of 5 MHz by substituting the optical fiber portion of the transmission line with a passive attenuator of same attenuation.

11 Claims, 4 Drawing Sheets

MODULATED AND DEPOLARIZED OPTICAL SIGNAL TRANSMISSION SYSTEM

DESCRIPTION

The present invention relates to an optical telecommunication system comprising a modulated and depolarized optical signal transmitter.

Known among the signal transmission techniques is the one that comprises modulating the radiation emitted from one or more optical sources and transmitting the modulated radiation to appropriate receiving stations by means of optical fibre lines, optionally comprised of optical amplifiers.

It is particularly known that the distribution of television signals, in addition to being carried out by means of coaxial cable networks, can be also achieved by the use of optical fibres or a mixed system (fibres+coaxial cables).

Obtaining of the optical signal modulation can be made either directly (by intervention on the optical source, usually a laser) or indirectly, by an optical modulator.

An indirect optical modulator enabling to operate by means of a modulating signal of very high frequencies (such as the television channel carriers conventionally ranging from 40 to 860 MHz) consists for example of a Mach-Zehnder-type interferometer built up on lithium niobate ($LiNbO_3$).

During a series of experiments concerning transmission of optical signals in a CAble TeleVision (CATV) installation, the Applicant was able to observe problems in the correct reception of the optical signals connected with changes in the noise present at the receiver. The Applicant has envisaged the possibility that these problems could depend on the features of the optical fibres employed for signal transmission and could be in particular connected with the residual birefringence present in some types of commonly used optical fibres, that is the property of these fibres to transmit radiation at different speeds, at least locally, depending on the respective polarization directions.

Therefore the Applicant faced the task of accomplishing an optical signal transmission system free from this type of problem and capable of correctly operating also in the case that residual birefringence is present in the optical fibres employed for signal transmission.

The Applicant tried to solve the above problems by depolarizing the optical signal to be transmitted, that is causing the signal not to have a preferential polarization direction.

U.S. Pat. No. 4,572,608, in the name of K. Mochizuki et al., discloses a depolarizer comprising optical fibres having a difference in the propagation time of signals having polarizations directed according to orthogonal polarization axes (polarization mode dispersion). In particular, FIG. 6 accompanying said patent relates to a depolarizer comprising two optical fibres of the above identified type placed in succession, relatively oriented in such a manner that a polarization axis of the first fibre forms an angle of 45° with respect to a polarization axis of the second fibre. The device is for example appropriate when polarization-maintaining fibres of a length ranging between 1 and 2 meters are used to depolarize a radiation characterized by a coherence time of about 1 ps, such as the radiation issued from a multimode oscillation semiconductor laser.

A similar device is described in an article entitled "Degree of polarization in jointed fibres: the Lyot depolarizer" by K. Mochizuki, published on Applied Optics, Vol. 23, No. 19, 1.10.84, pages 3284–3288.

The Applicant could observe that the devices described in the above two documents are not adapted to depolarize the propagating optical radiation in an optical communication system with coherence times on the order of nanoseconds or tons of nanoseconds, except when resorting to polarization-maintaining fibres of a length of some kilometers or several ten kilometers, which is undesirable due to the resulting attenuation (about 0.7 dB/km in the 1500 nm wavelength band) and bulkiness, in addition to the very high costs of this type of optical fibre.

U.S. Pat. No. 5,430,795, in the name of H. Taga et al., discloses a device adapted to depolarize a narrow-band laser radiation employed for optical communication systems at very high speed, with a row width of about 100 MHz or lower. The device aims at making the signal reception stable by eliminating power variations due to dependence on the optical amplifier polarization. The device is comprised of a circuit for transmission, along distinct optical paths of different length (two polarization-maintaining fibres, for example), of two signal components having orthogonal polarizations, separating them by a polarization splitter and recombining them, after the two optical paths, by means of a polarization combiner, as an alternative to a previous technique providing the use of a single polarization-maintaining fibre.

It is known that an optical signal propagating along an optical fibre can give rise to radiation generation by Stimulated Brillouin Scattering (SBS) in case of high optical power density. This radiation may represent a noise source capable of hindering or preventing a correct signal reception at the optical fibre end.

It is also known, from U.S. Pat. No. 4,560,246 (in the name of D. Cotter) and EP 565,035 (in the name of Hitachi Ltd.) for example, that the optical threshold power of said SBS phenomenon in an optical fibre is raised in case of widening, by phase modulation, of the frequency band of the propagating optical signal.

In one aspect, the present invention relates to an optical communication system comprising:

an optical source adapted to emit an optical radiation;

an optical modulator receiving said optical radiation and a transmission signal having frequencies included within a signal band and adapted to emit a modulated optical signal having a predetermined optical bandwidth;

an optical transmission line comprising an optical fibre portion;

an optical receiver adapted to receive said optical signal in the presence of a predetermined signal-to-noise ratio (SNR) in said signal band, measured in a 5 MHz band,
characterized in that it comprises a depolarizer optically connected between said optical modulator and optical transmission line and comprising two polarization-maintaining optical fibre portions having predetermined lengths and birefringence, optically connected with each other so that the respective polarization axes form an angle of 45°, in which said optical bandwidth and said lengths and birefringence of said polarization-maintaining optical fibres are operatively selected in such a manner that said SNR at the receiver in said signal band does not differ more than 1 dB from the SNR at the receiver measured in a 5 MHz band, after substituting said optical fibre portion of said transmission line with a passive attenuator of same attenuation.

Preferably, said optical bandwidth and said lengths and birefringence of said polarization-maintaining optical fibres are operatively selected in such a manner that said SNR at the receiver does not differ more than 0.5 dB from the SNR at the receiver in said signal band measured in a 5 MHz band after substituting said optical fibre portion of said transmission line with a passive attenuator of same attenuation.

Preferably said optical fibre length of said transmission line has a birefringence exceeding $5 \times 10^{-6}$ ps/m at least locally.

In an advantageous embodiment of the present invention said optical modulator comprises one amplitude modulator and one phase modulator, that can be made in planar optics and be combined on the same substrate.

Preferably, said length of said second polarization-maintaining optical fibre portion is substantially twice said length of said first polarization-maintaining optical fibre portion.

Preferably the sum of said lengths of said first and second polarization-maintaining optical fibre portions is lower than 1 km, more preferably lower than 100 m.

In a second aspect, the present invention relates to an optical transmitter comprising:

an optical source adapted to emit radiation from an output thereof having a first bandwidth lower than 100 MHz;

an optical modulator connected by an optical input thereof with the ouput of said optical radiation source, receiving a first modulating signal at a first modulation input thereof and a second modulating signal at a second modulation input thereof, which second modulating signal is adapted to modulate the amplitude of the radiation from said radiation source at said first modulating signal and to modulate the radiation phase from said radiation source at said second modulating signal, so that the spectral envelope of the modulated radiation emitted from a modulator output has a predetermined second bandwidth;

characterized in that if further comprises a depolarizer optically connected to the output of said optical modulator and comprising:

a first polarization-maintaining optical fibre, having mutually orthogonal polarization axes and one predetermined length;

a second polarization-maintaining optical fibre having mutually orthogonal polarization axes and a length which is substantially twice said one predetermined length;

in which said first and second polarization-maintaining optical fibres are optically connected with each other in such a manner that a polarization axis of said first fibre and a polarization axis of said second fibre form an angle of 45°, in which said second bandwidth and said length are such selected that the optical radiation at the output of said depolarizer is substantially depolarized and in which said depolarizer has an overall optical attenuation of, or lower than 2 dB.

Preferably said depolarizer has an overall optical attenuation of, or lower than 1 dB.

Preferably the sum of the lengths of said first and second polarization-maintaining optical fibres is lower than 1 km, more preferably lower than 100 m.

In a third aspect, the present invention relates to an optical signal transmitting method comprising the steps of:

generating a modulated optical radiation having a predetermined bandwidth;

transmitting the depolarized radiation along an optical fibre having a birefringence exceeding $5 \times 10^{-6}$ ps/m at least locally;

receiving this radiation;

characterized in that it comprises depolarizing said optical radiation substantially, and in that said bandwidth is capable of avoiding generation of noise due to stimulated Brillouin scattering along said optical fibre.

More details will become apparent from the following description, with reference to the accompanying drawings, in which.

An optical signal transmitting system in accordance with the present invention will be now described with reference to FIG. 1.

An optical source 1, preferably consisting of a laser, is optically connected by an optical fibre 2, for example, to an input of an optical modulator 10. In the case that the radiation from source 1 is polarized at least partly (if the optical radiation source 1 consists of a semiconductor laser for example), the optical fibre 2 can be advantageously of the polarization-maintaining type.

The optical modulator 10 comprises an amplitude modulator 3, receiving a given transmission signal 5 at one input thereof and a phase modulator 4, receiving a phase modulating signal at an input thereof, from a signal generator 6. The amplitude modulator 3 and phase modulator 4 are optically connected with each other. In the shown configuration the phase modulator 4 is placed downstream of the amplitude modulator 3, but it is also possible to use the opposite configuration, in which the phase modulator precedes the amplitude modulator. Both modulators can be combined in a single component in planar optics, for example of the type employing a single substrate on which the two modulators are obtained. This substrate, for example, can be formed of $LiNbO_3$.

In an alternative version, modulator 10 may comprise components different from the amplitude modulator 3 and phase modulator 4. For instance, it is possible to use a single modulator, or several amplitude, phase, or frequency modulators altogether enabling the radiation from the optical source 1 to be modulated with the information contained in the transmission signal 5 and the optical signal band coming out of the optical modulator itself to be widened, as specified in the following.

The optical modulator 10 output is connected, preferably through an optical amplifier 7, to an input of a depolarizer 20, the output of which is connected to an optical fibre transmission line 30, of a length of several ten or hundred kilometers, terminating at the input of an optical receiving station 40. A spectrum analyzer 45 can be connected to the output of the optical receiving station 40, to detect the spectrum of the transmitted signal.

The optical fibre transmission line 30 is represented, by way of example, as formed of portions 11, 13, 15 of optical fibre, alternated with optical amplifiers 12, 14. The number, length and specific features of the optical fibre portions, as well as the number, position and structure of the optical amplifiers can vary depending on the particular features of the communication system. Should the overall lengths of line 30 and the transmitted powers enable it, amplifiers 12, 14 could be omitted.

The optical power amplifier 7 is adapted to raise the optical signal power to a sufficient level so as to enable the transmission of same without the consequent attenuation impairing the reception thereof, at least along the optical fibre portion 11 placed downstream of the optical power amplifier itself.

The depolarizer 20 is formed of two polarization-maintaining optical fibre portions 8, 9 optically connected with each other in a geometrically defined way, by a fusing joint, so that the related polarization axes form an angle of 45°. The lengths and birefringence of the optical fibres 8, 9 are such selected, as specified in the following, that at the output of fibre 9 an efficient depolarization of the signals inputted to fibre 8 is achieved. In particular the length of fibre 9 is about twice the length of fibre 8.

The overall attenuation of a depolarizer adapted to supply an efficient signal depolarization is preferably lower than 2 dB, and more preferably lower than 1 dB.

The overall length of this depolarization is preferably lower than 1 km and more preferably lower than 100 m.

Alternatively to the shown configuration, it is possible to optically connect the depolarizer 20 upstream of optical power amplifier 7, instead of downstream of same. In this alternative configuration the power of the optical signal sent into the transmission line is greater, to the expense of a slight increase of the overall noise figure of the device, due to the attenuation by the depolarizer 20 that would be localized at the input, instead of at the output, of the optical power amplifier 7.

Figure 1:
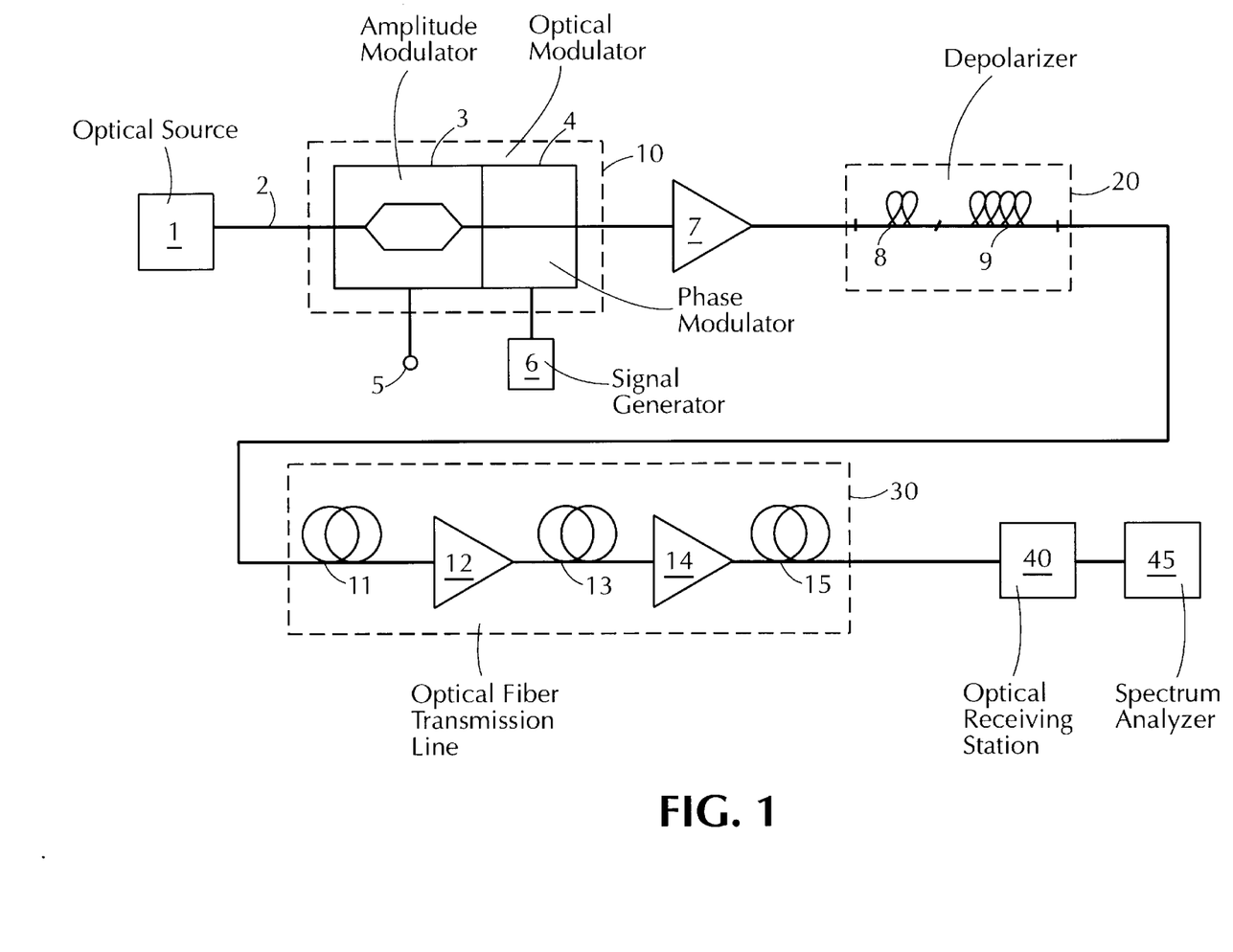
FIG. 1 shows a diagram of an optical communication system according to the present invention.

Operation of the system shown in FIG. 1 is as follows: the amplitude of the optical radiation generated from source 1, preferably of a constant value on emission, is modulated in the amplitude modulator 3, based on a transmission signal 5 suitably fed to the input of the amplitude modulator 3.

The phase modulator 4 then modulates the optical phase of the amplitude modulated signal according to a phase modulation signal from a signal generator 5 of fixed frequency and amplitude, which can be an electronic generator generating a sine signal for example. By effect of the phase modulation, the frequency spectrum band of the modulated optical signal is widened. The resulting bandwidth for the optical signal depends, according to known relations, on the frequency and amplitude of the phase modulation signal.

In addition to phase modulation, different techniques can be used for widening the band of the optical communication signal, such as frequency or amplitude modulation of the optical signal itself or superposition of noise on the transmission signal inputted to modulator 3.

In the case of the present invention the band of the optical communication signal is widened to an extent at least sufficient to avoid generating of radiation by Stimulated Brillouin Scattering, according to relations known to a person skilled in the art, from the previously mentioned references for example.

For instance, in the case of a system providing radiation transmission along single-mode silica based fibres at a wavelength of 1550 nm, with an input power to the fibre of about 17 dBm, a bandwidth of 39 GHz of the optical signal enables the SBS threshold of the system not to be exceeded.

If widening of the optical signal band takes place by phase modulation, the power and frequency of the modulating electrical signal are such selected that, according to known relations, the required band widening of the optical signal is achieved.

In particular, the phase modulation of an optical signal modifies the spectrum thereof, distributing part of the spectral energy density present in the signal band to form a given number of bands frequency spaced apart the same distance, with a separation equal to the phase modulating signal frequency, that are disposed on the spectrum on either side of the central frequency band of the optical signal entering the modulator.

The number and relative intensity of the side bands are connected with the phase modulation index (maximum phase shift imposed to the optical signal by effect of the phase modulation), in turn depending on the phase-modulating signal power. By suitably selecting the phase modulation index, the spectral form of the overall band resulting from the envelope of the side and central bands can be determined and, by suitably selecting the phase modulation frequency and therefore fixing the frequency separation between the side bands, the frequency width of this overall band can also be determined.

To avoid signal distortions, the phase modulation frequency shall be at all events at least twice the maximum frequency of the transmission signal (860 MHz should the transmission signal be the superposition of CATV signals according to one of the existing standards).

The Applicant was able to observe that, in the presence of a sufficiently wide signal band, such as the one present downstream of modulator 10, the optical signal can be substantially depolarized (at least 70%, for example) by means of a simple and practical device such as the described polarizer 20, in particular enabling the use of polarization-maintaining fibres 8, 9 of such a length that a reduced attenuation and bulkiness can be provided.

By the present invention the achievement of an efficient depolarization is deemed possible in the presence of the signal band indicated downstream of modulator 10, with the use of a depolarizer having an overall attenuation lower than 2 dB.

Some experiments carried out by the Applicant will be now described. In FIGS. 1–6, to which reference is made in the foregoing of the present description, similar components have been allocated identical reference numerals.

In these experiments, the optical source 1 consists of a semiconductor laser of the DFB type comprising an optical isolator at the output, of an emission wavelength $\lambda_s$=1550 nm, optical output power of about 13 dBm and bandwidth of about 30 MHz, optically connected by a polarization-maintaining optical fibre section 2, to the input of an electro-optical modulator 10 model PIR PIM 1510, manufactured by the assignee of this application having a maximum attenuation of 4 dB for the optical signals. The electro-optical modulator comprises, combined on the same substrate of $LiNbO_3$, an amplitude modulator of the Mach-Zehnder type and a phase modulator. The amplitude and phase modulation of the optical signal takes place independently, by electrical signals sent to the respective electrodes in the modulator. In the experimental configuration adopted, in order to detect the transmission system noise alone, the described experiments were carried out in the absence of communication signals.

The phase modulation electrode was conveniently connected to an electric generator, set to emit a sine signal at a frequency of 2.2 GHz. The peak-to-peak amplitude of this phase modulation signal was operatively selected in such a manner that the optical signal spectrum should be formed of the envelope of nine side bands of the signal band entering the modulator, the different side bands having an almost uniform intensity. The above was achieved for such a peak-to-peak amplitude of the phase modulating signal that the phase of the incoming optical signal could be varied by a maximum value included between $3\pi$ and $4\pi$.

The bandwidth of the optical signal, following the phase modulation, was about 39 GHz in the frequency domain (corresponding to approximately a 0.3 nm wavelength in the vacuum).

Figure 3:
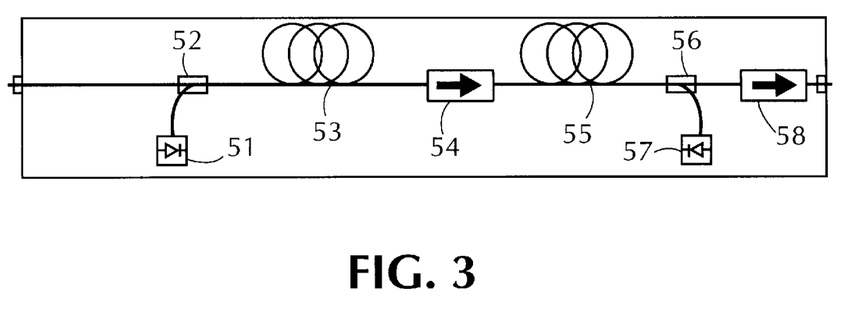
FIG. 3 is a diagram of an optical power amplifier adapted for use in the present invention.

The optical power amplifier 7 consisted of an erbium-doped fibre amplifier, manufactured by the assignee of this application having a general optical diagram as shown in FIG. 3.

It is a two-stage amplifier, in which each amplifying stage is separately pumped at a 980 nm wavelength and comprises an active fibre portion having an erbium-doped core of Si/Ge/Al. The first stage, codirectionally pumped, by a pump laser 51 and a dichroic coupler 52, comprises an active fibre portion 53 of a length of about 18 m, and is optically connected by an optical isolator 54 to the second stage, codirectionally pumped by a pump laser 57 and a dichroic coupler 56, comprising an active fibre portion 55 about 21 m long and terminating with a second optical isolator 58. The typical saturation output power of this amplifer, in the wavelength band included between 1534 and 1560 nm, is about 17 dBm.

Connected to the end of an optical fibre transmission line 30 described in the following, is an optical receiver 40 consisting of a pin photodiode carrying out conversion of the signal to an electric form, followed by an electric spectrum analyzer 45.

EXPERIMENT 1

Figure 2:
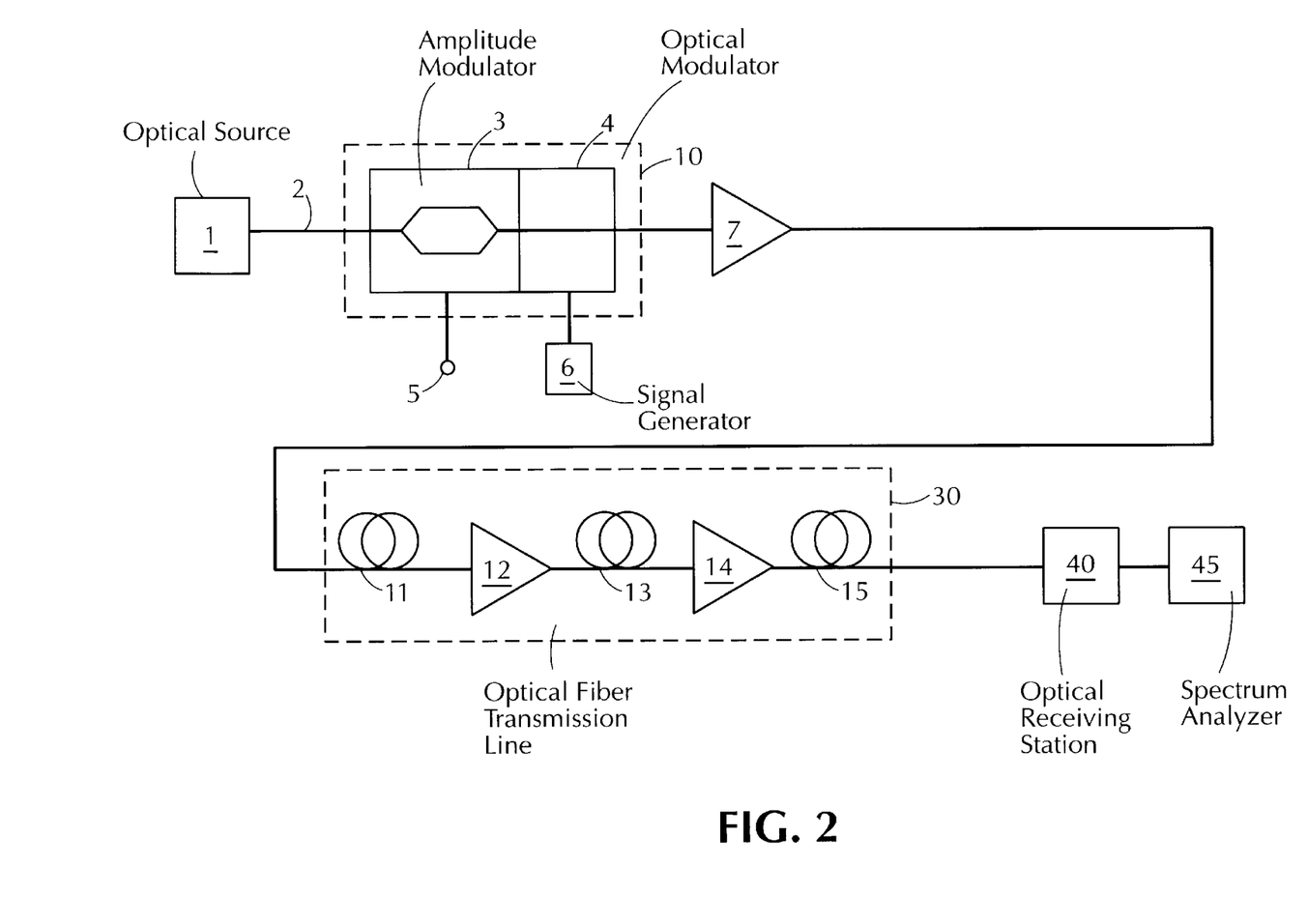
FIG. 2 is a diagram of an experimental configuration adopted for measurement of noise in the communication system.

One experiment was carried out employing the configuration shown in FIG. 2. In this configuration a depolarizer was not present and there was a direct optical connection between the optical power amplifier 7 output and the input of the transmission line 30.

Figure 4:
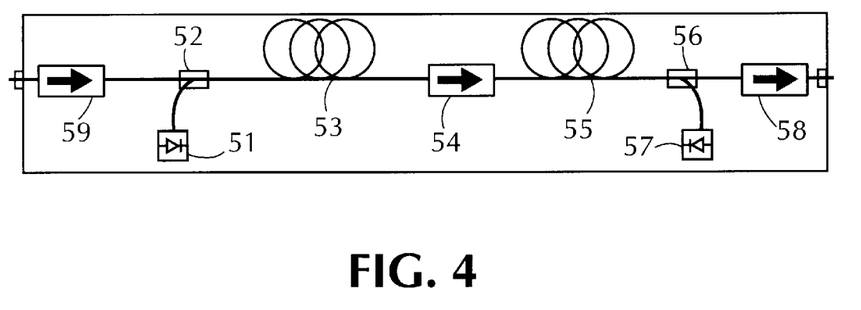
FIG. 4 is a diagram of an optical line amplifier adapted for use in the present invention.

The transmission line 30 employed for signal transmission was comprised of one portion 11 of optical fibre of the step-index type of a length of 48 km, made following the Vapor Axial Deposition (VAP) technology, two portions 13, 15 of optical fibre of the step-index type of a length of 42.6 km, made following the Outside Vapor Deposition (OVD) technology and two optical line amplifiers 12, 14 made of erbium-doped active fibre, optically connected between the fibre portions 11, 13 and 13, 15, respectively. The optical line amplifiers, manufactured by the assignee of this application had a general diagram as shown in FIG. 4 and were each comprised of an input optical isolator 59, the remaining parts thereof being identical with those of the previously described optical power amplifier, with reference to FIG. 3.

Figure 5:
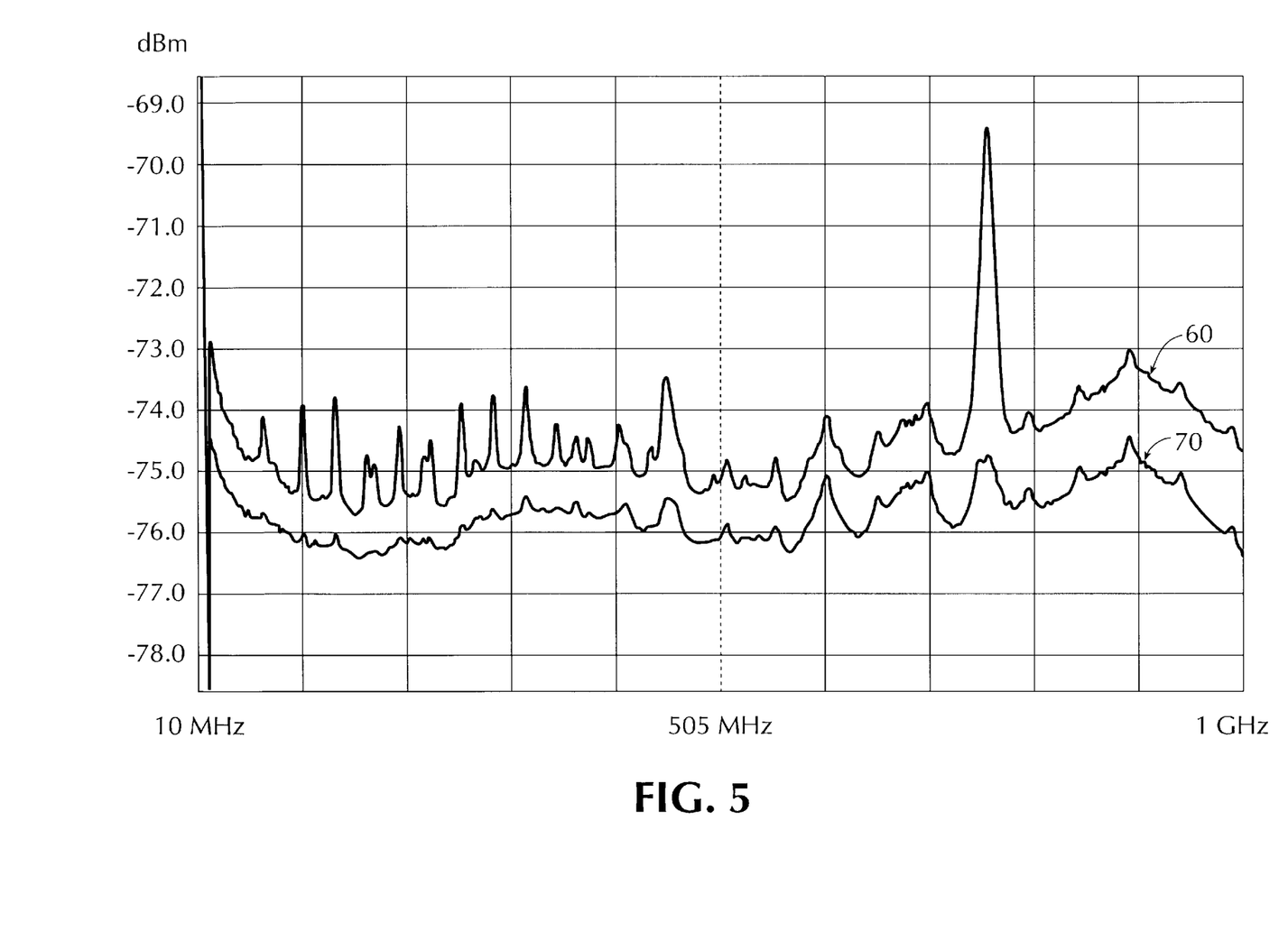
FIG. 5 is a graph of the noise spectrum in the absence of signals under different experimental conditions.

Denoted by 60 in FIG. 5 is the spectral curve of the observed noise, at the end of the optical transmission line, by means of the spectrum analyzer 45. The graph reproduces in the y axis, expressed in dBm, the spectrum of the noise measured in a 5 MHz band, in the absence of modulating communication signals, at frequencies included within the 10 MHz–1 GHz band, as reproduced in the x axis. A background noise is present which is substantially coincident with the noise observed in the case in which the optical fibres 11, 13, 15 were substituted with optical attenuators which were such set that each of them provided an attenuation equivalent to that of the corresponding fibre. In addition, many peaks at different frequencies included in the conventional band employed for television signals (40–860 MHz) can be seen in curve 60, superposed on the background noise. (The peak of the greatest intensity, placed outside this frequency band, is instead due to the phase modulation at a frequency of 2.2 GHz operated by the phase modulator 6).

Subsequent measurement repetitions enabled to note that the noise peaks, that in curve 60 exceed the background noise by about 1–2 dB, greatly vary in time, as regards both their frequency position and intensity compared with the background noise. The spectral curves related to these repeated measurements are not reproduced, as they are identical with curve 60 in FIG. 5.

In register with noise variations, variations of opposite sign in the signal-to-noise ratio (SNR) can be seen.

The peak position and intensity proved to be particularly responsive to mechanical stresses over the optical fibre portion 11, which stresses were exerted through bendings and formation of localized turns at different positions along the fibres.

Following said stresses, noise peaks of an intensity reaching 10 dB greater than the background noise were observed.

Practically, similar stresses are produced by disturbances such as thermal cycles, vibrations and the like and this makes such noise peaks particularly detrimental to transmission. In fact, the noticed variations in the background noise represent a strong restriction to an overall correct operation of an analog transmission system of the type herein described, in particular due to the uneven noise variation at the different frequencies of possible use for signal transmission, involving instability in the SNR, with independent and unpredictable variations of same for each communication channel.

EXPERIMENT 2

Figure 6:
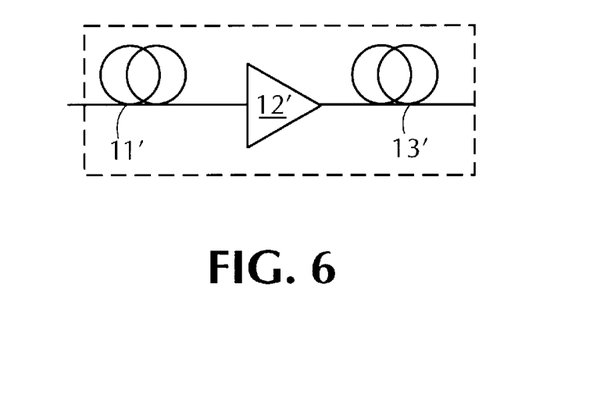
FIG. 6 shows a diagram of an experimental configuration adopted for measurement of noise in the communication system.

In a further experiment, instead of the transmission line 30 of the preceding experiment, a transmission line 30' was used which comprised an optical fibre 11' of the step-index type, of a length of 42.6 km, made following the OVD (Outside Vapor Deposition) technology; an optical amplifier 12' similar to the line amplifier 12 used in the preceding experiment; and an optical fibre 13' of the step-index type, of a length of 48 km, made following the VAD (Vapor Axial Deposition) technology, all optically connected in series with each other in accordance with what is shown in FIG. 6.

In this experiment the optical fibres 11' and 13' were mechanically stressed at different points along the respective lengths. One could see that stress on fibre 13' gives rise to instability in the noise spectrum, following the same modalities as seen during the preceding experiment, whereas instabilities of this type are not present when fibre 11' alone is stressed.

A series of similar measurements was repetated, modifying the optical fibre connections relative to the amplifier 12', and more particulary fibre 13' was connected upstream of the amplifier 12' and fibre 11' downstream of same. In this case too, instability in the noise spectrum could be observed as a result of mechanical stresses on fibre 13', whereas no instability was present when fibre 11' was stressed.

The Applicant, based on these tests, has come to the conclusion that the problem of noise encountered at the receiver is connected with the passive optical fibres in the optical transmission line and in particular it does not originate from the optical amplifiers placed along the transmission line itself.

Measurement of birefringency of fibres 11' and 13' revealed an important difference between the two fibres. Fibre 11' showed an average propagation delay of about $4 \times 10^{-6}$ ps/m between signals polarized according to the two orthogonal polarization axes. The corresponding delay for fibre 13' was about $8 \times 10^{-6}$ ps/m, that is twice that present with fibre 11'.

The Applicant could observe that the instability problem in the noise spectrum is particularly important in the case in which the employed optical fibres for signal transmission have a relatively high residual birefringence, higher than $5 \times 10^{-6}$ ps/m at least locally for example, over a portion longer than some kilometers.

EXPERIMENT 3

The Applicant then submitted the operation of a device according to the present invention to an experimental test. The device manufactured following the general diagram in FIG. 1 and representing a modification of the device described with reference to FIG. 2, was comprised of a depolarizer 20 optically connected between the amplifier 7 output and the transmission line 30 input.

The depolarizer 20 consisted of two polarization-maintaining optical fibre portions 8, 9, 16.1 and 32.2 m long respectively, optically sealed with each other, by fusion welding, so that the respective polarization axes should form an angle of 45°. The employed polarization-maintaining fibre was of the PANDA type and more particularly a model produced by Fujikura (JP) and identified as SM(C)15-P, typically characterized by a birefringence of 1.47 ps/m, expressed as a delay per unit length between propagating signals having polarizations oriented according to the orthogonal polarization axes in the fibre.

The overall attenuation of the depolarizer 20 comprising losses due to coupling, attenuation of fibres 8 and 9 and the fusion joint between the fibres was about 0.5 dB.

The transmission line employed in the progress of the experiment was the same transmission line 30 used during the first experiment.

The curve 70 in FIG. 5 reproduces the spectral curve of the noise noticed at the end of the optical transmission line by means of the spectrum analyzer 45.

To enable an easy comparison with curve 60, curve 70 was represented slightly translated towards lower values of the y axis.

One can see that in the presence of the depolarizer 20, the intensity of the noise peaks is greatly reduced.

Repeated measurements did not give rise to important variations in the noise spectrum, even in the presence of mechanical stresses of the fibres, similar to those of the preceding experiments.

EXPERIMENT 4

In a configuration similar to the one described in connection with Experiment 3, SNR measurements were carried out in the presence of transmission signal at a frequency within the 40–860 MHz band. These values were compared with the measured SNR values, when fibres 11, 13, 15 were substituted with attenuators of an attenuation equal to the optical signal wavelength the other conditions remaining unchanged.

One could see that the measured SNR in a 5 MHz band, in the presence of the optical fibres 11, 13, 15, does not differ more than 0.5 dB from the SNR measured in a 5 MHz band, in the presence of attenuators in place of the optical fibres 11, 13, 15.

In this case too repetition of measurement did not give rise to important variations in the SNR, even in the presence of mechanical stresses on the fibre similar to those applied in the preceding experiments.

One could estimate that, in general, with the use of the present invention the deviation between the SNR measured in a 5 MHz band in the presence of the optical fibres 11, 13, 15, and the SNR measured in a 5 MHz band in the presence of attenuators in place of the optical fibres 11, 13, 15, does not exceed 1 dB.

We claim:

1. An optical communication system comprising:

an optical source adapted to emit an optical radiation;

an optical modulator receiving said optical radiation and a transmission signal having frequencies included within a signal band and adapted to emit a modulated optical signal having a predetermined optical bandwidth;

an optical transmission line comprising an optical fibre portion;

an optical receiver adapted to receive said optical signal in the presence of a predetermined signal-to-noise ratio (SNR) in said signal band, measured in a 5 MHz band;

a depolarizer optically connected between said optical modulator and said optical transmission line and comprising two polarization-maintaining optical fibre portions having predetermined lengths and birefringence and optically connected with each other so that the respective polarization axes form an angle of 45°, wherein said optical bandwidth and said lengths and birefringence of said polarization-maintaining optical fibres are operatively selected in such a manner that said SNR at the receiver in said signal band does not differ more than 0.5 dB from the SNR at the receiver in said signal band measured in a 5 MHz band after substituting said optical fibre portion of said transmission line with a passive attenuator of same attenuation.

2. An optical communication system according to claim 1, characterized in that said optical fibre length of said transmission line has a birefringence exceeding $5 \times 10^{-6}$ ps/m at least locally.

3. An optical communication system according to claim 1, characterized in that said optical modulator comprises one amplitude modulator and one phase modulator.

4. An optical communication system according to claim 3, characterized in that said amplitude modulator and phase modulator are made in planar optics.

5. An optical communication system according to claim 4, characterized in that said amplitude modulator and phase modulator are integrated on the same substrate.

6. An optical communication system comprising:

an optical source adapted to emit an optical radiation;

an optical modulator receiving said optical radiation and a transmission signal having frequencies included within a signal band and adapted to emit a modulated optical signal having a predetermined optical bandwidth;

an optical transmission line comprising an optical fibre portion;

an optical receiver adapted to receive said optical signal in the presence of a predetermined signal-to-noise ratio (SNR) in said signal band, measured in a 5 MHz band;

a depolarizer optically connected between said optical modulator and said optical transmission line and comprising first and second polarization-maintaining optical fibre portions having predetermined lengths and birefringence and optically connected with each other so that the respective polarization axes form an angle of 45°, wherein said optical bandwidth and said lengths and birefringence of said polarization-maintaining optical fibres are operatively selected in such a manner that said SNR at the receiver in said signal band does not differ more than 1 dB from the SNR at the receiver in said signal band measured in a 5 MHz band after substituting said optical fibre portion of said transmission line with a passive attenuator of same attenuation and wherein said length of said second polarization-maintaining optical fibre portion is substantially twice said length of said first polarization-maintaining optical fibre portion.

7. An optical communication system comprising:

an optical source adapted to emit an optical radiation;

an optical modulator receiving said optical radiation and a transmission signal having frequencies included within a signal band and adapted to emit a modulated optical signal having a predetermined optical bandwidth;

an optical transmission line comprising an optical fibre portion;

an optical receiver adapted to receive said optical signal in the presence of a predetermined signal-to-noise ratio (SNR) in said signal band, measured in a 5 MHz band;

a depolarizer optically connected between said optical modulator and said optical transmission line and comprising first and second polarization-maintaining optical fibre portions having predetermined lengths and birefringence and optically connected with each other so that the respective polarization axes form an angle of 45°, wherein said optical bandwidth and said lengths and birefringence of said polarization-maintaining optical fibres are operatively selected in such a manner that said SNR at the receiver in said signal band does not differ more than 1 dB from the SNR at the receiver in said signal band measured in a 5 MHz band after substituting said optical fibre portion of said transmission line with a passive attenuator of same attenuation and wherein the sum of said lengths of said first and second polarization-maintaining optical fibre portions is lower than 1 km.

8. An optical communication system according to claim 7, characterized in that the sum of said lengths of said first and second polarization-maintaining optical fibre portions is lower than 100 m.

9. An optical transmitter comprising:

an optical source adapted to emit from an output radiation having a first bandwidth lower than 100 MHz;

an optical modulator having an optical input connected to the output of said optical radiation source and receiving a first modulating signal at a first modulation input and a second modulating signal at a second modulation input, wherein said optical modulator is adapted to modulate the amplitude of the radiation from said radiation source at said first modulating signal and to modulate the radiation phase from said radiation source at said second modulating signal so that the spectral envelope of the modulated radiation emitted from an output of the optical modulator has a predetermined second bandwidth;

a depolarizer optically connected to the output of said optical modulator and including an output, the depolarizer comprising:

a first polarization-maintaining optical fibre having mutually orthogonal polarization axes and a first predetermined length;

a second polarization-maintaining optical fibre having mutually orthogonal polarization axes and a length which is substantially twice said first predetermined length, wherein said first and second polarization-maintaining optical fibres are optically connected with each other in such a manner that a polarization axis of said first fibre and a polarization axis of said second fibre form an angle of 45°, wherein said second bandwidth and said lengths of said first and second fibres are selected such that the optical radiation at the output of said depolarizer is substantially depolarized, wherein said depolarizer has an overall optical attenuation of or lower than 2 dB and wherein the sum of the lengths of said first and second polarization-maintaining optical fibres is lower than 1 km.

10. An optical transmitter according to claim 9, characterized in that said depolarizer has an overall optical attenuation of, or lower than 1 dB.

11. An optical transmitter according to claim 9, characterized in that the sum of the lengths of said first and second polarization-maintaining optical fibres is lower than 100 m.

* * * * *